Figure 1:
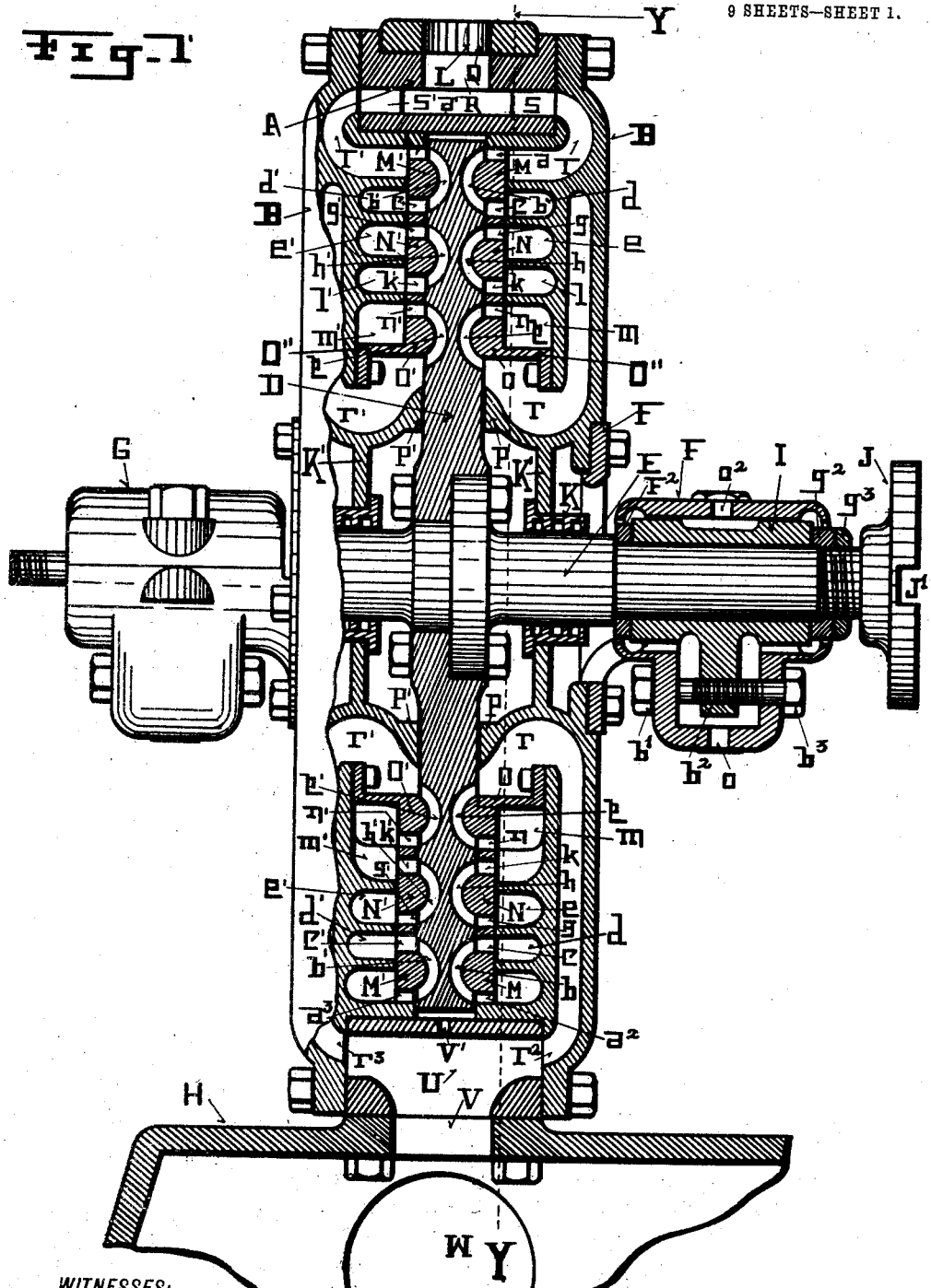

No. 833,305. PATENTED OCT. 16, 1906.
C. W. DAKE.
ELASTIC FLUID TURBINE.
APPLICATION FILED NOV. 29, 1905.

9 SHEETS—SHEET 2.

WITNESSES:
Ethel A. Bradford
Culen G. Guinfield

INVENTOR
Charles W. Dake
BY
Chappell & Earl
ATTORNEYS

No. 833,305. PATENTED OCT. 16, 1906.
C. W. DAKE.
ELASTIC FLUID TURBINE.
APPLICATION FILED NOV. 29, 1905.
9 SHEETS—SHEET 3.
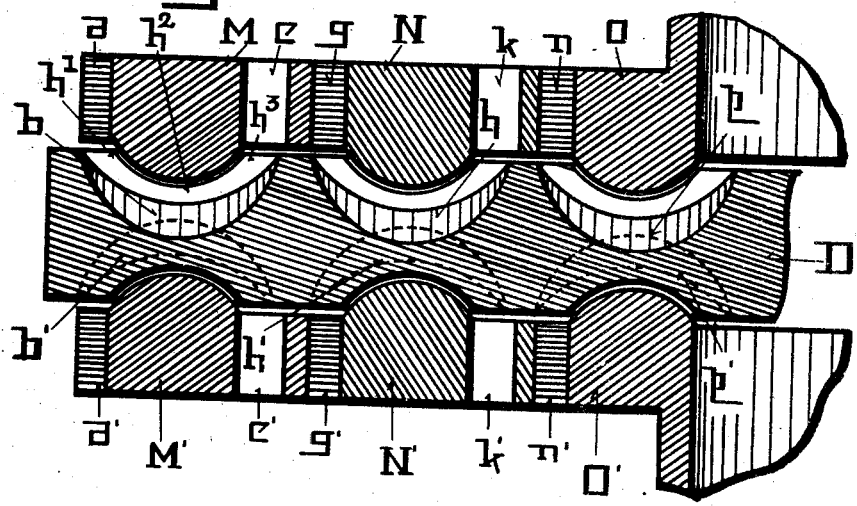
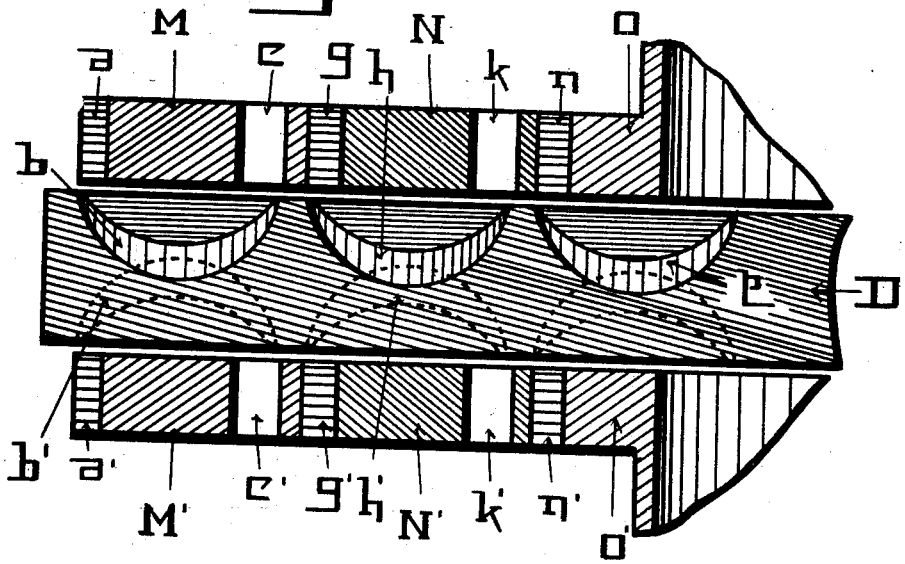
WITNESSES:
Ethel A. Bradford
Lulu G. Greenfield
INVENTOR
Charles W. Dake
BY
Chappell & Earl
ATTORNEYS No. 833,305. PATENTED OCT. 16, 1906.
C. W. DAKE.
ELASTIC FLUID TURBINE.
APPLICATION FILED NOV. 29, 1905.
9 SHEETS—SHEET 4.

WITNESSES:
Ethel A. Bradford
Lulu G. Greenfield

INVENTOR
Charles W. Dake
BY
Chappell & Earl
ATTORNEYS

No. 833,305. PATENTED OCT. 16, 1906.
C. W. DAKE.
ELASTIC FLUID TURBINE.
APPLICATION FILED NOV. 29, 1905.

9 SHEETS—SHEET 5.

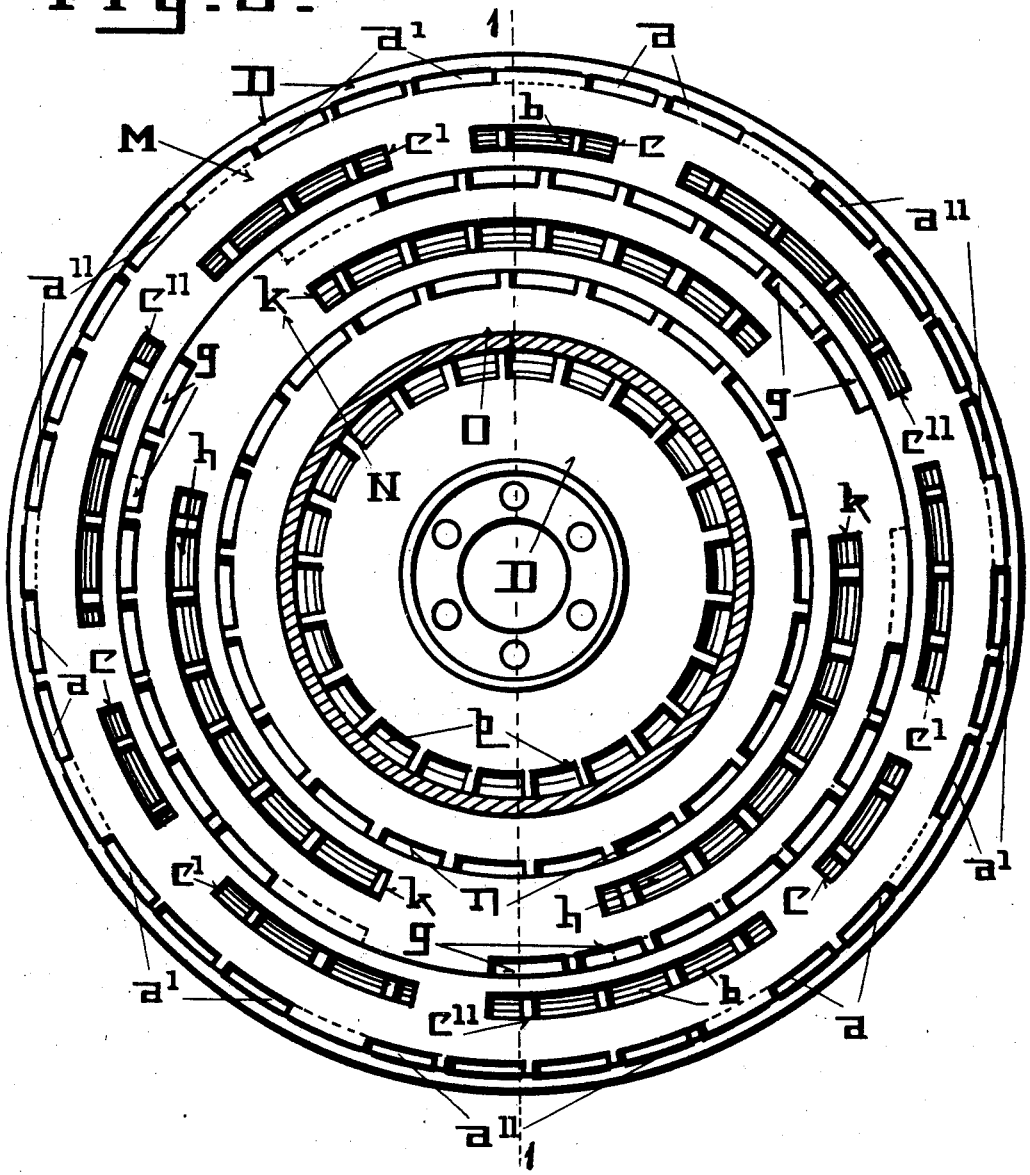

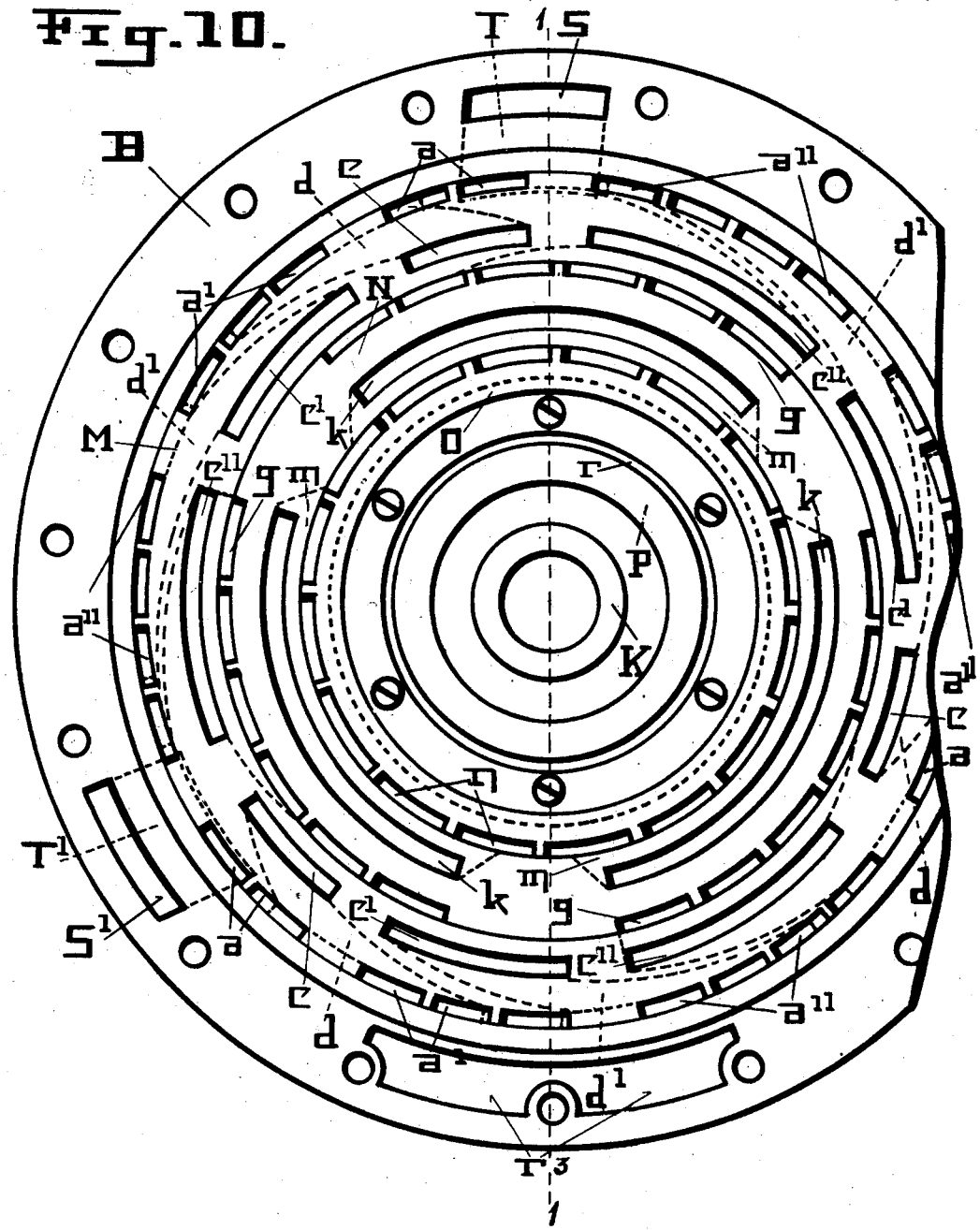

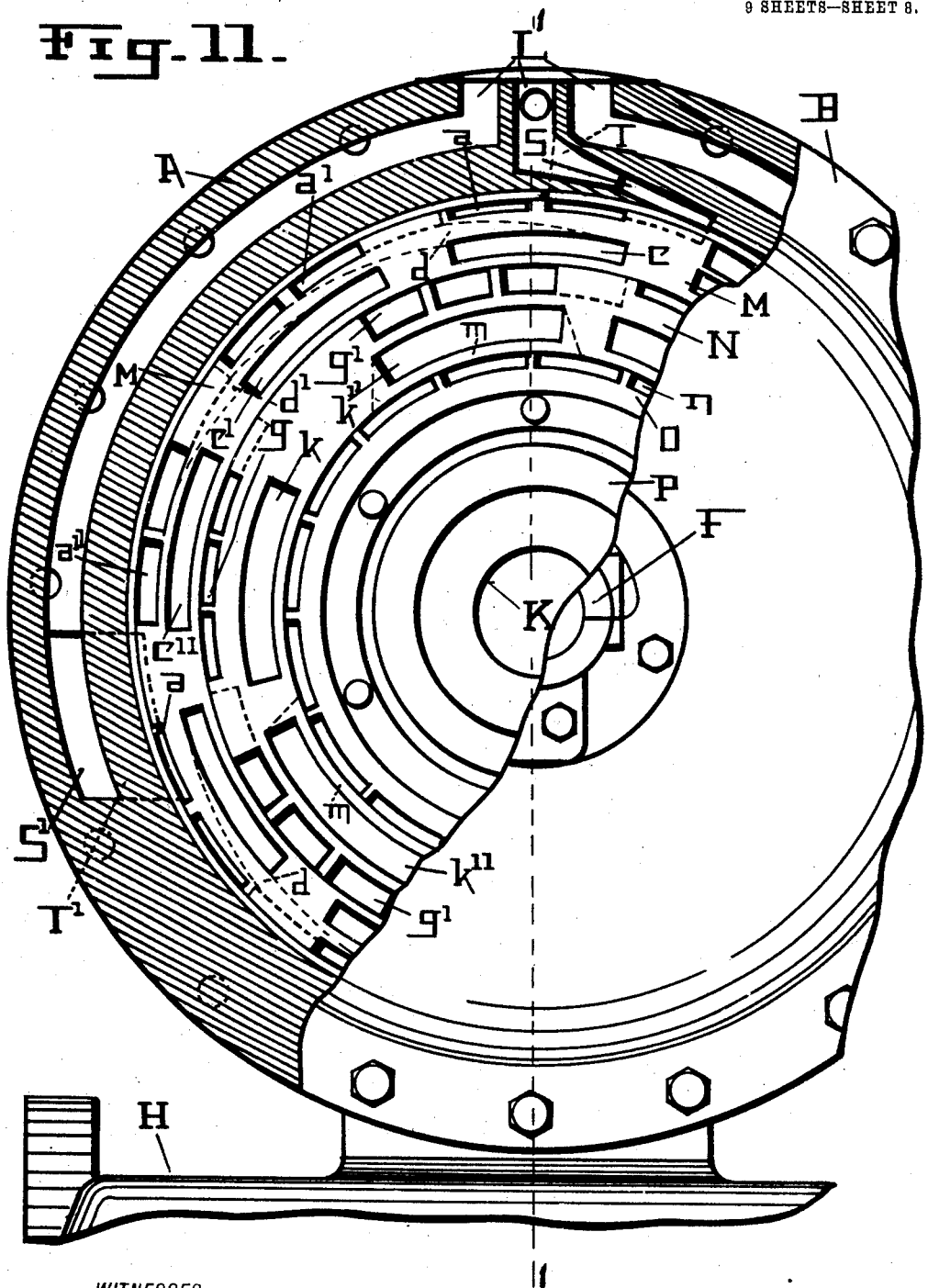

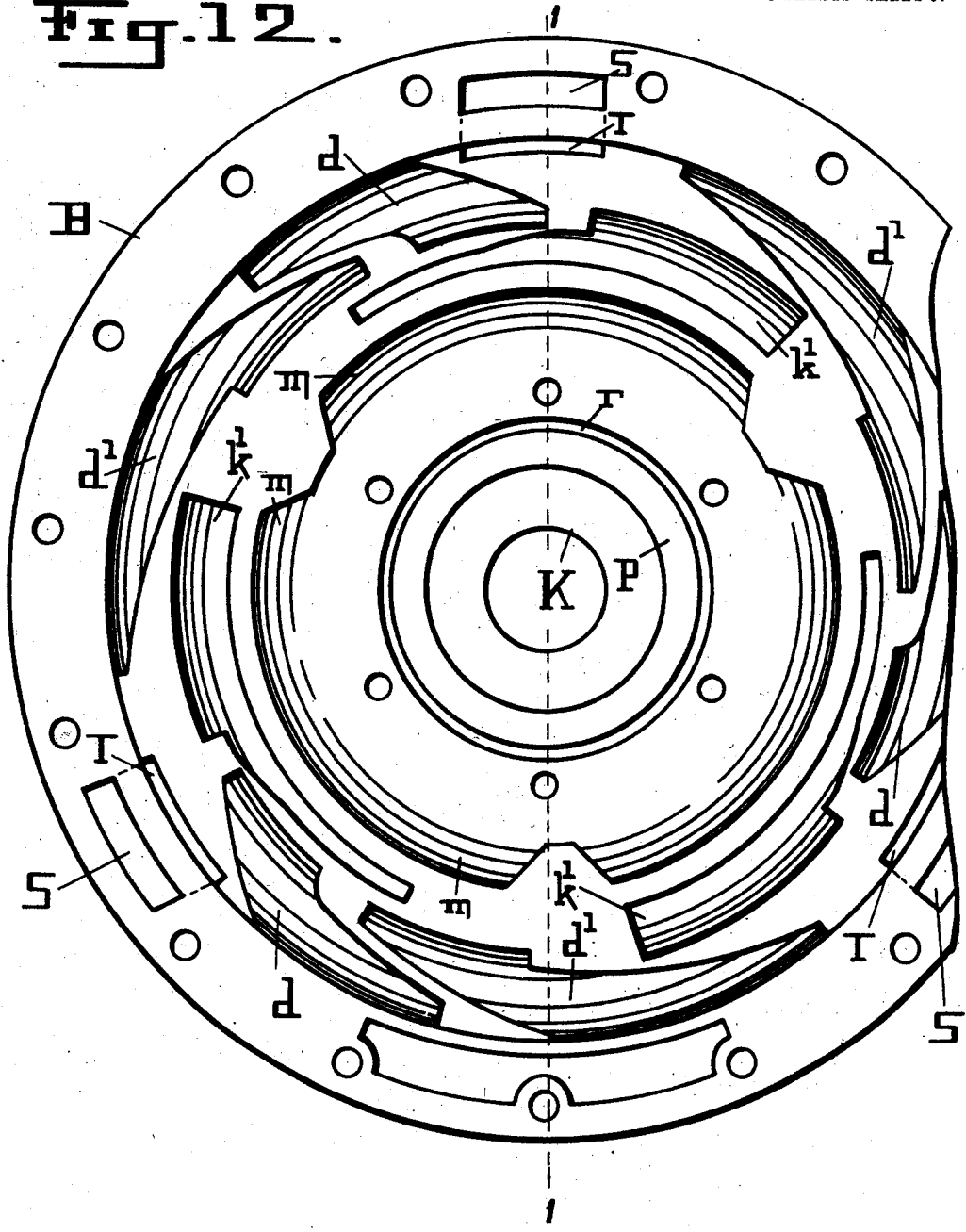

UNITED STATES PATENT OFFICE.

CHARLES W. DAKE, OF GRAND RAPIDS, MICHIGAN.

ELASTIC-FLUID TURBINE.

No. 833,305.   Specification of Letters Patent.   Patented Oct. 16, 1906.

Application filed November 29, 1905. Serial No. 289,654.

*To all whom it may concern:*

Be it known that I, CHARLES W. DAKE, a citizen of the United States, residing at Grand Rapids, county of Kent, State of Michigan, have invented certain new and useful Improvements in Elastic-Fluid Turbines, of which the following is a specification.

This invention relates to improvements in elastic-fluid turbines.

The objects of this invention are, first, to increase the efficiency of an elastic-fluid turbine of a given size; second, to produce an effective elastic-fluid turbine of comparatively small size and provide a structure well adapted to such smaller sizes which shall be economical in use; third, to utilize as fully as possible in an elastic-fluid turbine both the direct and expansive force of the fluid; fourth, to provide an improved means for the utilization of the expansion and of compounding in a comparatively small elastic-fluid turbine utilizing a single disk; fifth, to give increased room for expansion as the expansive fluid travels through the engine or turbine; sixth, to utilize the expansive force of the fluid as the revolving wheel advances the buckets which receive the expansive fluid, so that the wheel receives the expansive force during its entire revolution; seventh, to provide an improved form of bucket and nozzle arrangement; eighth, to provide an improved form of bucket and form and arrangement of adjacent parts to avoid unnecessary space and effectively utilize the jets; ninth, to provide an improved construction and arrangement of parts whereby the various parts may be readily formed by machinery, thereby insuring great accuracy and speed in manufacture; tenth, to provide an improved general arrangement of parts whereby accuracy of adjustment and accessibility of parts, both internal and external, is secured, and, eleventh, to provide in an elastic-fluid turbine an improved casing with series of expansive chambers.

Further objects and objects relating to details of construction will more fully appear from the detailed description to follow.

I accomplish the objects of this invention by the devices and means described in the following specification.

The invention is clearly defined, and pointed out in the claims.

The objects of my invention are accomplished by the devices and mechanism illustrated in the accompanying drawings, forming a part of this specification, in which—

Figure 2:
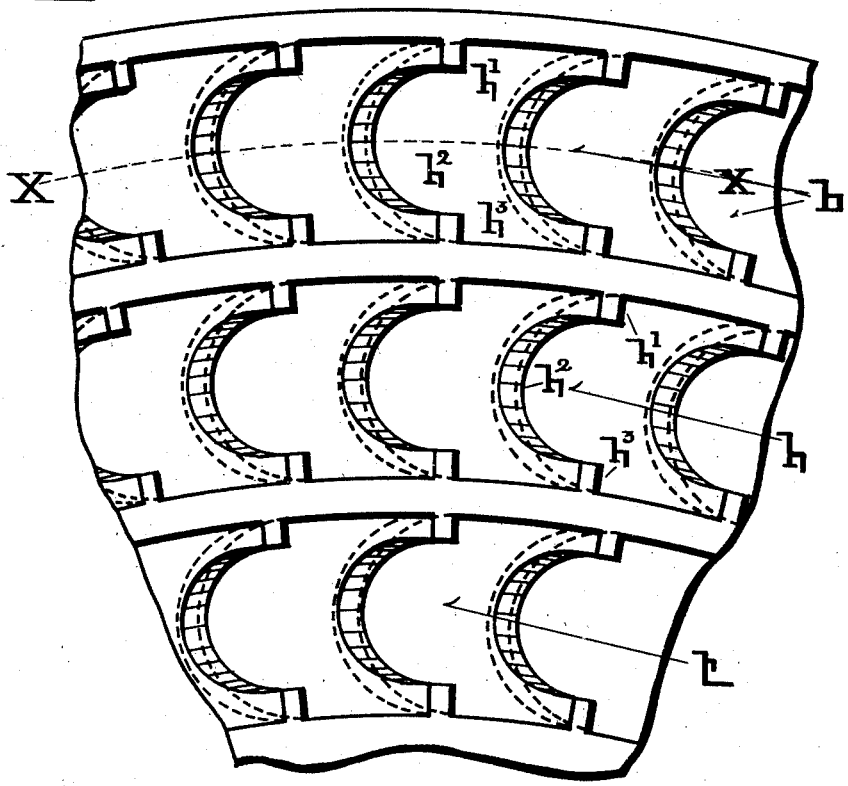
Figure 3:
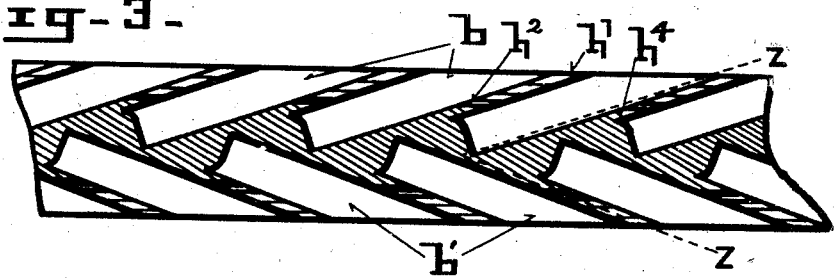
Figure 6:
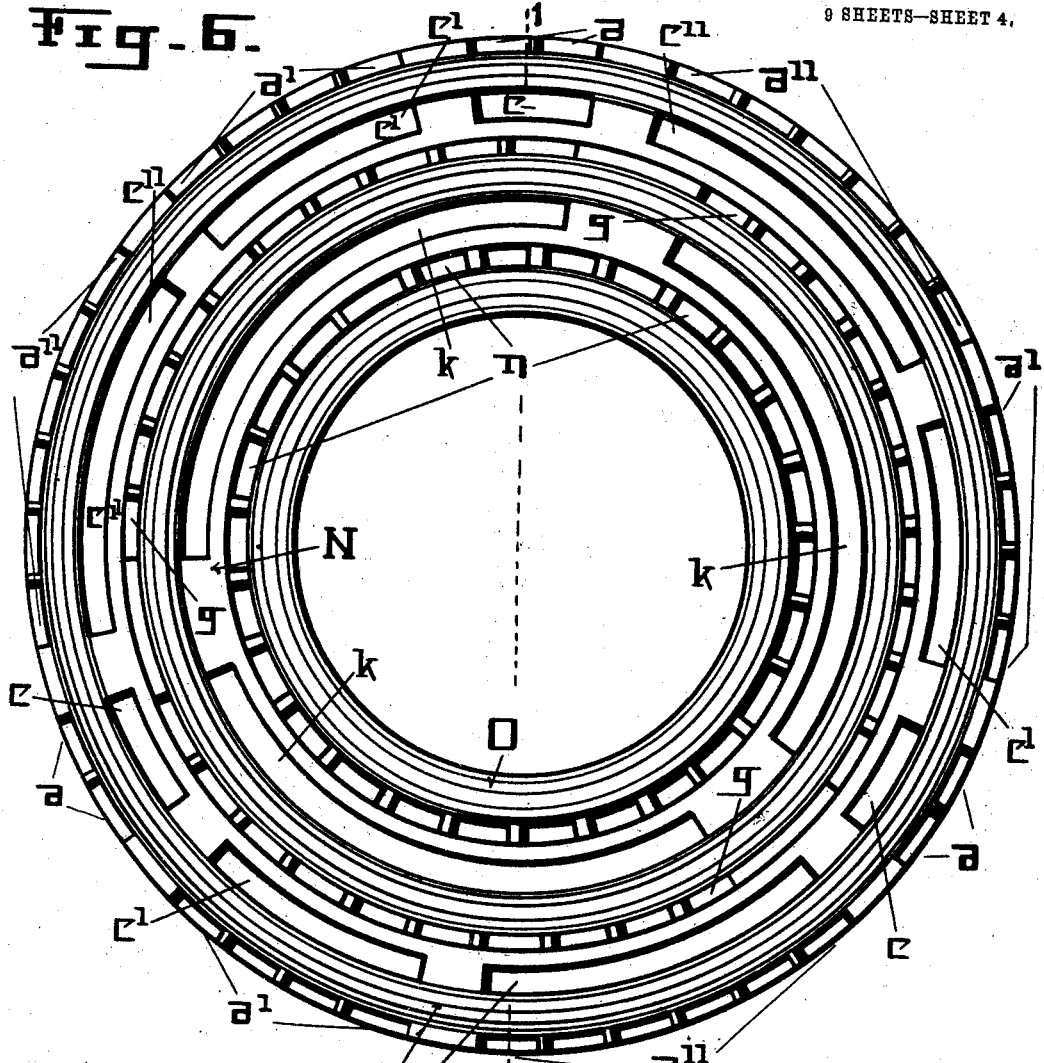
Figure 7:
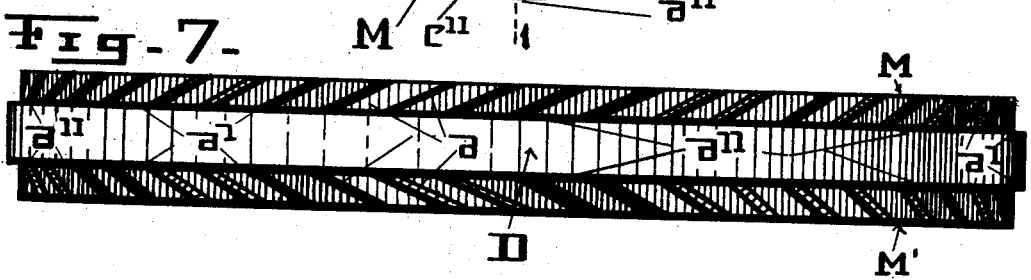
Figure 8:
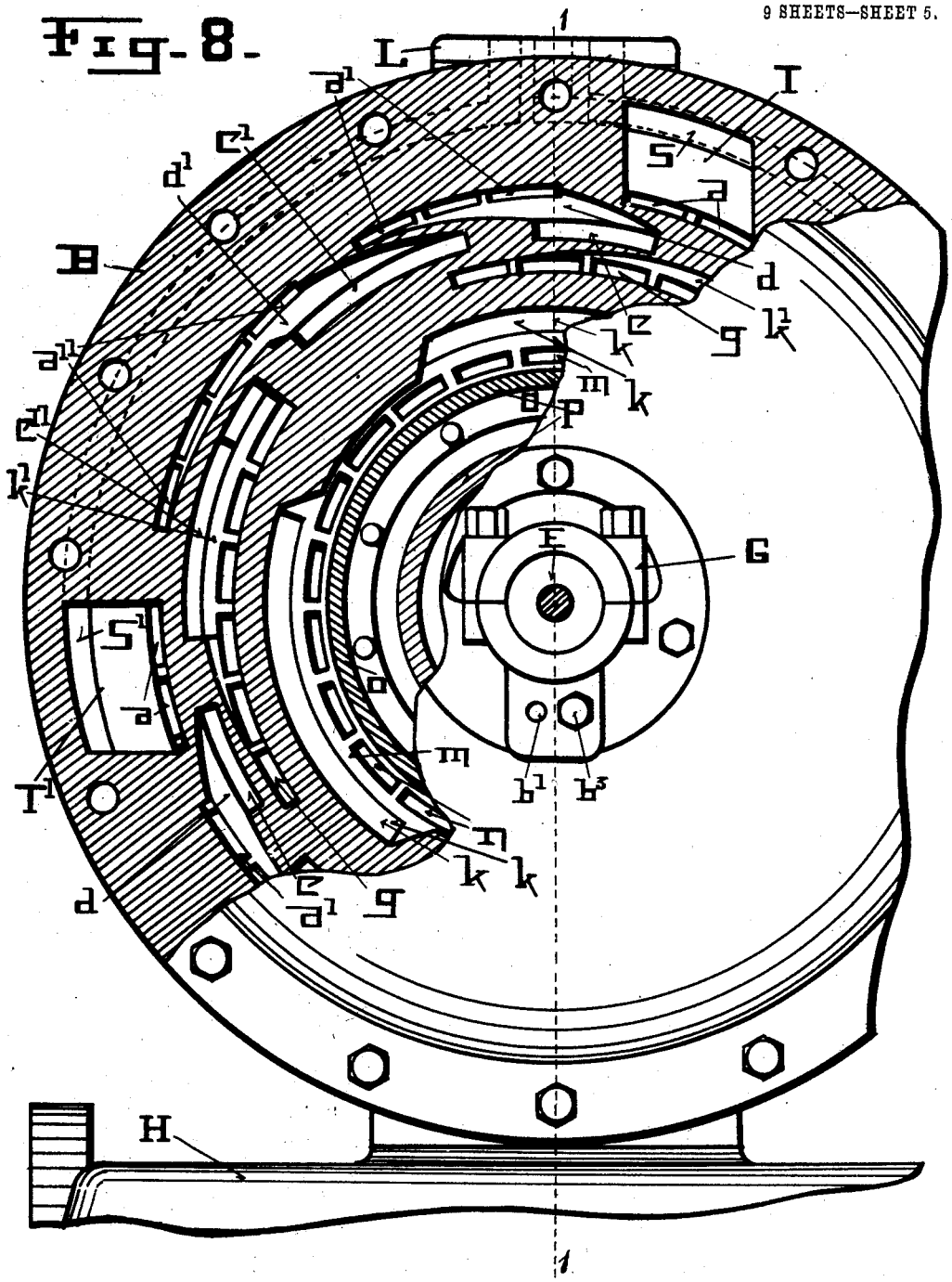

Figure 1 is a central vertical detail longitudinal sectional elevation view taken on line corresponding to line 1 1 of Figs. 6, 8, 9, 10, and 12. Fig. 2 is an enlarged detail view of a portion of the face of the wheel, showing the arrangement of the buckets. Fig. 3 is a sectional view taken on the curved line $x$ $x$ of Fig. 2, showing the cross-sectional view and arrangement of the buckets in relation to each other. Fig. 4 is a further detail sectional view through the wheel and rings, taken on a line corresponding to irregular line $z$ $z$ of Fig. 3, showing the preferred construction with rounded rings. Fig. 5 is a similar sectional view showing the structure with flat rings. Fig. 6 is a detail face view of the specially-formed rings removed from the casing. Fig. 7 is a peripheral view of the said rings with the wheel or disk between. Fig. 8 is a detail sectional view, portions being broken away, taken on a line corresponding to line $y$ $y$ of Fig. 1 looking toward the left, showing the arrangement and connection of the chambers in the casing and the nozzles and exit-passages in the rings. Fig. 9 is a detail view, partly in section, of the rings and wheel removed from the casing, taken on a line corresponding to line $y$ $y$ of Fig. 1, the flange of the ring O only being sectioned, looking toward the left through the rings against the wheel. Fig. 10 is a detail view of the left-hand casing B removed looking toward the face, showing the nozzles and connecting-passages, the rings being in position, the chambers being indicated by dotted lines. Fig. 11 is a sectional view of a modification, taken on a line corresponding to line $y$ $y$ of Fig. 1, showing a different method of distributing the high-pressure steam to the different points on the wheel by dividing it into three passages at the beginning, also showing a method of increasing the area of the nozzles by increasing the width of the expansion over the high-pressure nozzles. Fig. 12 is a detail face view of the left-hand casing B with the rings removed, showing the arrangement of the chambers and other parts.

Referring to the lettered parts of the drawings, the casing consists of a comparatively heavy casing-ring A, which is supported in position on a suitable base H. Side pieces B B of special construction, hereinafter to be described, are secured to the opposite sides of the ring A and complete the casing. A suitable flange Q is preferably located at the top of this ring for connecting the source of supply, as a steam-boiler, to the engine. The passage L extends from and through this flange, branching in the ring of the casing to deliver the expansive fluid at three different points equidistant around the casing through short passages $s\ s'$. This is shown modified and made into three separate passages L in Fig. 11, such modification being preserved and illustrated in Fig. 8. An exhaust V is through the bottom of the ring down through into the base H, an exhaust-passage W leading out of this base to the outside air or to a condenser, as preferred.

Suitable bearing-boxes F and G are provided for supporting the shaft E of the engine. These boxings are supported by sides B B of the casing, being connected by suitable brackets. The boxing G at the left of Fig. 1 has no means for adjusting the shaft longitudinally; but the shaft is permitted free movement longitudinally therein, so that the adjusting means in the boxing F is free to act upon the shaft and secure its proper adjustment.

Within the boxing F is a bushing I, with a downwardly-extending arm $b^2$ extending down into a chamber beneath the boxing. This chamber has a suitable drainage-opening $o$ for drawing off the lubricating-oil to return it through the aperture $o^2$ at the top of the bearing. The bushing is adjustable by a pair of screws $b'\ b^3$, arranged parallel with the shaft E, the screws being side by side, as indicated in Fig. 8, so that one screw can be loosened and the opposite one tightened and the bushing be moved longitudinally in the direction of the axis of the shaft. The bushing rests in this boxing on suitably-prepared ways or plane surface, so that it can be thus readily adjusted. Oil-passages are cut into the casing just under the bushing, as clearly appears in Fig. 1. A shoulder is cut on the shaft E, and a thrust-collar $F^2$ is crowded up against the shoulder, the bushing contacting with this collar in effecting the adjustment of the shaft in relation to the casing. The outer end of the shaft is provided with a screw-threaded collar $g^2$, which screws up to a proper fit against the end of the bushing I to permit the free rotation of the shaft and retain the shaft against end play in the bushing. This screw-threaded collar is then locked in position by a lock-nut $g^3$ being screwed up tight against it.

A coupling-flange J, with the usual notch $J'$, is on the outer end of the shaft.

A suitable flange, comparatively broad, is formed on the middle portion of the shaft E for securing the turbine-wheel thereto, the wheel being carefully fitted to the said flange and retained by suitable bolts therethrough, as clearly appears in Fig. 1.

The turbine disk or wheel D is double-faced and is in the preferred form shown provided with three concentric rings of buckets on each face, although, of course, this number of rings of buckets can be varied and a single ring or a multiplicity of such rings be utilized. The faces of the disk are first turned flat. Then annular concentric grooves, conforming to the rings of buckets, are turned in the opposite faces, such grooves being preferably a portion of the arc of a true circle in cross-section. Buckets are then cut into the opposite faces of the disk by a circular milling tool set at an acute angle of about twenty degrees, the form of the same being clearly indicated in Fig. 2, where an enlarged detail of the same is shown. The milling-tool is not a portion of a true cylinder, but has a projecting lip at one side which gives a slightly irregular cross-section, the outer side being a little deeper cut, as clearly appears in Fig. 3. This configuration secures an opening into the face of the bucket on a substantially straight line coinciding with the circle of the margin buckets. This structure secures a turbine disk or wheel of a single continuous piece of metal, so that there are no joints or parts to work loose. I am aware that walls of separate pieces, which to a certain extent, overlap, are illustrated in the prior patent to E. C. Terry, October 13, 1903, No. 741,385; but that structure does not show any of the advantages of the integral construction or of this arrangement in securing compactness in the device.

It will be seen by a reference to Fig. 3 that each bucket extends beyond the center of the disk, but being placed at an angle they can be staggered so that it is possible to put in the buckets in a comparatively thin turbine wheel or disk, and it will be noted that as these buckets are cut into the face of the turbine-disk at an angle they are overlapped, by which means a very large number of buckets can be put into a comparatively thin wheel and the frequency of the impulses of the jets in operation thereby very greatly increased, so that while this improved elastic-fluid-turbine engine operates by a series of impulses those impulses are substantially continuous.

This turbine-wheel is slightly less in diameter than the interior of the casing-ring, thereby forming a slight open space entirely around the disk at this point, certainly insuring no friction between the parts. A small drainage-vent $v'$ is at the bottom to permit of the discharge of any moisture of condensation that may find its way into this part.

The three concentric rows of buckets of the structure that I have illustrated extend from near the periphery of the disk rather more than half of the distance toward the center. Casings B B are provided, which are bolted securely to the opposite faces of the ring A and are conformed to extend up close to the face of the disk at its periphery, and then the main portion of the casing extends outwardly and thence toward the central portion, coming into close relation to the face of the disks at P' P and at P' P' on opposite sides thereof within the circle of the inner rows of buckets. There is no contact between the casing and disk; but the parts are arranged as close as possible without contact.

The casings B B on each side are provided with suitable supply and expansion chambers, from which the elastic fluid is delivered under pressure through suitable nozzles to the buckets and eventually discharges into suitable chambers in said casing, which exhaust-chambers are connected by passages U and V to the hollow base and are thence conveyed away or are taken to a suitable condenser.

Nozzles are formed on the edges of suitable rings, which when the rings are assembled together concentrically complete the walls of the nozzles. These rings are indicated by the reference-letters M', N', and O' and M, N, and O, respectively, such rings being clearly indicated in Fig. 6, the edges of the rings, with the turbine-disk interposed, appearing in Fig. 7.

A portion of each ring is conformed to fit into the annular groove of its corresponding ring of buckets on the turbine-disk, and the periphery is cut into at intervals obliquely, as appears in Fig. 7, forming kerfs through the edge, which, it is obvious, can be done by a suitable machine, these kerfs when the ring is in place in the casing forming a series of nozzles extending entirely around the turbine-disk, although, of course, if these series of nozzles only extend a part of the way they would serve their function as far as they did extend.

Just within the rounded projecting portion of each ring and corresponding to the discharge end of the particular ring of buckets openings are cut through the rings for the discharge from the buckets.

As it is the purpose here to let the elastic fluid pass after it has in a measure done its work, the particular care with which the openings are constructed is not material, and it does not matter about their being accurately machined in any particular. They should be smooth and ample. These exhaust-openings, however, are of different dimensions, corresponding to the dimensions of the chambers within the casing to which the elastic fluid is to be delivered on its way through the engine, these being specifically lettered in each group as $c$ $c'$ $c''$ in Fig. 6 of the drawings, and the particular nozzle-passages corresponding to these outlet-openings are lettered $a$ for the passage $c$, $a'$ for the passage $c'$, and $a''$ for the passages $c''$, $g$ for passages K and $u$ for exhaust $r$ in each instance, showing the relation of these parts to each other by this special lettering, although there is no especial or material difference between the various nozzles formed in the peripheries of the rings. This completes the description of these rings.

It will be observed that the convex portion of each ring fits in the groove or concave part of each ring of buckets in the disk. By this means the size of the buckets, so far as the volume of elastic fluid that they will consume is concerned, is greatly reduced, and the jets of elastic fluid will be confined and will deliver with full force directly into the specially-formed buckets, thereby greatly increasing the efficiency and more completely utilizing the energy to be developed by the expansion of such elastic fluid.

In the casing the inlet chambers or passages and the expansion chambers or passages and the exhaust chamber or passage are all separated and completed except for the connection between them through the buckets by the locating and the securing of the rings therein, so that it will be seen that when these rings are completed and in position they present substantially all of the finished surface that comes in proximity to the turbine, the exception being the points where the outer casing approaches the sides of the turbine wheel or disk, as I have hereinbefore indicated.

The outer ring M' fits at its periphery within an inwardly-projecting flange of the casing, the periphery of the ring N' fits within the ring M', and these rings are secured to the casing by screws therethrough or by any other suitable means. The central ring O' is not extended and provided with outlet-passages therethrough; but an annular flange O'' extends outwardly therefrom and is secured by suitable bolts to the casing-shell. the extension on these flanges O and O' not being necessary to form the discharge passages and to fit the parts to a concentric ring, because it is the innermost ring of each series.

The relations of the nozzles and the passages to the buckets most clearly appear in Fig. 9, the buckets on the turbine-disk being illustrated back of the rings in each instance. The relations of the nozzles and of outlets from the buckets also appear in Figs. 4 and 5, where the overlapping of the buckets from opposite sides also clearly appears.

Considering the casings B B, it will be remembered that the rings close and separate the expansion-chambers and the exhaust-chambers so they are connected to each other successively only through the buckets of the turbine-disk. The casing sides B B are each divided into these parts having a series of chambers exactly similar, increasing in size from the inlet in the casing to the outlet or exhaust at the center, the inner expansion, chamber and the exhaust being common to the three series. These chambers extend spirally around the casings, the smallest in each group being indicated by letter $d$ and the next largest by $d'$, both of which are in line with the outer rings of the bucket. The next largest chamber is $k'$, the inner ring having a chamber which embraces all the nozzles therefor, (indicated by the reference-letter M,) the expansive fluid passing from this inner expansion around the ring through the inner row of buckets to the exhaust-chamber R.

The exhaust-chambers R and $r$ are annular, extending around the driving-shaft and connected, through the passages $r^2$ and $r^3$, to the main exhaust U V in the bottom of the casing-ring, down through the base, as before indicated, extending inwardly from the casing-plates B B or flange $k'$, which are fitted with suitable packing devices $k$ to prevent the passage of water or elastic fluid along the shaft toward the bearings, thereby preventing waste and in the use of steam preventing undue heating of these bearing parts. By the arrangement of these expansion-chambers and exhaust-chambers as indicated it is obvious from the event of steam being the motive fluid that it does not come in contact with the axle or bearing parts, except as some slight leakage may occur, and consequently one of these parts become unduly heated. Further than this, the fluid, of whatever description, is delivered well toward the peripheries of the disk, where its power will be exerted to the best advantage.

Having thus described the various parts and indicated their arrangement in my improved elastic-fluid turbine, I will now indicate its operation by pointing out definitely the progress of any expansive fluid, as steam, that may pass through it. In the description of this operation I will refer to the expansive fluid in this connection as "steam" for greater convenience and speed in describing such operation.

The steam enters from a suitable supply through the passage L and is distributed thereby to the three equidistant points around the circumference of the turbine, passing from the ring outwardly at each side through the passages $s$ and $s'$ to each of the sections of the casing referred to. The steam then passes through the passages T and T' direct to the high-pressure nozzles $a$ and $a'$ of each section. The steam is there delivered at two nozzles on each side in each section, the jets being projected obliquely into the buckets $b$ and $b'$. Owing to the shape of the cross-section of the buckets and their arrangement, the steam is delivered directly into the same without being in any way impeded by projecting parts, and, on the other hand, the bucket exactly corresponds and fits the nozzle, so that there is no waste from a jet of steam passing into a bucket that is too large. The steam is confined at this point by the convex ring on the casing, so that it is projected strongly against the bottom of the bucket and reacts strongly when it passes from the bucket through the discharge-passages $c$ therefrom. The steam enters the first expansion-chamber $d$, and from this expansion-chamber $d$ it passes through the nozzles $a'$, three in number, thence through buckets in the side of the wheel, the same as in the first instance, and into the next expansion-chamber $d'$, and from such expansion-chamber it again discharges through four nozzles $a''$, these nozzles in the rings being most clearly illustrated in Fig. 9 and are also indicated by the lettering in Fig. 6. The steam passing through the buckets from these nozzles $a''$ passes out into the expansion-chambers $k'$, whence it is delivered to the second row or ring of buckets through three separate groups of nozzles $g$, where they act upon the buckets of the second row of buckets, the same as the jets have heretofore acted upon the first row of buckets. From these nozzles after passing through the buckets the steam is discharged into central common expansion-chambers $m$ and $m'$ and from these chambers is delivered through the low-pressure expansion-nozzles N W', passing through the entire circle of buckets of the inner ring of buckets simultaneously and thence out around this inner ring into the exhaust-chambers $r$ and $r'$. These exhaust-chambers $r$ and $r'$ extend up to nearly the full diameter of the sides of the casing, forming an insulation to prevent condensation within the engine and preserve an even distribution of the temperature to avoid warping and consequent rubbing and friction of the parts. These exhaust-chambers are annular, extending as completely within the exterior of the casing as possible to conserve the heat and avoid warping, and the steam passes from this chamber down through the passages U and V into the base, from whence the same passes to the open air through the exhaust-opening W or to a suitable condenser, where a condenser is made use of. It will be seen from this that in this single-disk turbine the steam passes inwardly from the periphery of the turbine-disk, acting strongest at its periphery where the high pressure of the steam is delivered and expanding toward the center into expansion-chambers of successively-increasing volume, whereby as the pressure of the steam is reduced by the expansion it will be permitted to act more effectively on the slower-moving parts of the disk nearer the center, thereby securing an equal and even distribution of the power to be obtained therefrom. It will also be noted that with this arrangement leakage is almost entirely obviated, because the slight condensation between the parts will be held outward by the centrifugal force of the revolving disk and in that way counteract the tendency of the elastic fluid or steam to pass out of its proper course and leak from one set of buckets to the next. Also with this arrangement the steam does not come into proximity with the driving-shaft and the bearings, and therefore the additional heat of the steam is obviated and the facility for lubrication increased. With this arrangement the direct pressure is almost entirely obviated in proximity to the shaft and loss from leakage at that point is substantially overcome. By the distribution of the steam so that it acts upon both sides of the turbine-disk the thrust of the shaft in either direction is minimized, so that the friction is reduced as low as possible on the thrust-bearing, it only being the function of such thrust-bearing for such parts to hold the wheel exactly in position, as there is substantially no strain upon the turbine-disk to displace it between the casings and nozzles.

I have not shown any governor in connection with my improved engine, but such could be attached to the short end of a shaft and be applied in the ordinary way for governing steam-engines, although I prefer a special governor which I have invented for use in this connection which will be found described in patent application concurrent herewith.

While I have described my improved elastic turbine in detail and at length in the exact form which it seems to me is most practical and of greatest utility, I desire to remark that I have incidentally indicated modifications.

The sides of the disk might be left flat without the projecting rounded portions of the ring entering into the annular grooves in the rings or buckets, thereby of course eliminating that feature and produce a very effective machine. This modification is indicated in Fig. 5.

It is obvious also that a single row of buckets with a single row of nozzles of the kind that I have illustrated in groups would be very effective so far as it went; also, that the buckets might be confined to one side of the turbine-disk.

Obviously also the entire structure might be arranged with the shaft in a vertical position, a special base being preferably provided when the same is arranged in this position, although of course in small sizes the base H might be utilized as a bracket.

Other modifications and modifications of details will no doubt readily occur to those skilled in the art to which this invention pertains. I will remark, however, that I desire to claim my invention broadly, as well as in the specific embodiment which I have here illustrated.

Having thus described my invention, what I claim as new, and desire to secure by Letters Patent, is—

1. In combination with a rotating turbine-wheel, a plurality of separated rows of buckets upon the face of said wheel, a stationary casing therefor having separated spirally-formed chambers of varying capacities, stationary rings supported in the stationary casing and provided with a series of nozzles having openings leading from the said chambers increasing so that the volume of steam fed to the buckets through the nozzles successively increases as the wheel rotates to one row of buckets, and subsequently to another row of said buckets.

2. In combination with a turbine-wheel provided with a series of rows of buckets in the face of the said wheel, a stationary casing having rows of chambers of varying capacities, a stationary ring secured to the stationary casing of the engine and provided with a series of nozzles having openings leading from the said chambers increasing so that the volume of steam fed to the buckets through the nozzles successively increases as the wheel rotates to one row of buckets, and subsequently to another row of said buckets.

3. In combination with a rotating wheel mounted within a case and provided with a series of curved buckets $b$ and a series of curved buckets $p$, a stationary ring M secured to the case and a stationary ring O secured to the case, the ring M provided with a series of nozzles adapted to feed the steam in increasing volume to the wheel as it revolves, and the ring O provided with a series of nozzles adapted to feed the steam simultaneously to the buckets $p$ before said steam is expelled from the engine.

4. In a turbine-engine, the combination of the inclosing casing having separated rows of chambers of varying capacities, a revolving wheel provided with a plurality of rows of curved buckets in the face thereof so as to overlap each other, nozzles for feeding the steam successively into one row of the said curved buckets and subsequently to another row, and steam-passages for taking the steam from the said buckets.

5. In combination with a turbine-wheel mounted in a case, having a plurality of separated rows of chambers spirally formed of varying capacities, a plurality of rows of curved buckets arranged on the face of said wheel, inlet-passages leading from the said chambers and registering with the rows of buckets for feeding the steam thereto and steam-passages for the discharge of the steam.

6. In combination with a turbine-wheel having separated rows of buckets, a casing therefor having a plurality of spirally-formed chambers of varying capacities, means for feeding steam to one row of buckets in increasing volume, an auxiliary chamber communicating with one of the first-mentioned chambers, means for feeding steam from the auxiliary chamber to the last row of buckets in increasing volume and steam-passages for removing the steam from the engine.

7. In a turbine-engine, the combination with a supported case having separated rows of chambers spirally formed of varying capacities, a turbine wheel-mounted thereon and provided with rows of buckets, having communication with the respective rows of chambers, at least one row of buckets having communication with a discharge-port of the engine and adjustable bearings for the shaft of the said wheel.

8. In an elastic-fluid turbine-engine, the combination of a base H; a ring-casing A with sides B B therefor with passages for distributing the steam to different points in the circumference of the said casing; series of chambers $e$, $l$, and $m$ within the casing sides; an exhaust-chamber $r$ extending from the center of said casing outwardly within the outer shell, to embrace and insulate the internal parts by a jacket of the fluid; an inlet-passage S and T to supply the outer row or series of nozzles; a centrally-located shaft with a flange thereon; a turbine-wheel D with concentric rows of annular buckets $b$, $h$, and $p$ thereon, such buckets being U-shaped, semicircular in cross-section, an annular groove being formed through each series thereon and each bucket being recurved to receive the impulse from a nozzle at one side and to be advanced by the reaction of the fluid from the other side, secured to said flange; means for adjusting the bearing of the disk to control its relation to the said nozzles and rings; nozzle-rings M and N adapted to be secured to the casing side B having nozzles $a$ and $g$ formed on the peripheries thereof by diagonal kerfs therein, the face sides conformed to fit the annular grooves of said buckets, and having exit-passages $c$ and $k$ through the inner part of said rings and leading from the inner sides of said rows of buckets; a ring O with a suitable flange O'' for securing the same in place, having nozzles $n$ formed around its periphery and being of such dimension as to leave the inner sides of the inner ring of buckets open to form a continuous circular exit-passage at the center leading into the exhaust-chamber $r$; and passages $r^2$ from the exhaust-chamber to the exhaust-passages U V to the base, coacting as specified.

9. In an elastic-fluid turbine-engine, the combination of a base H; a ring-casing A with sides B B therefor with passages for distributing the steam to different points in the circumference of the said casing; series of chambers $e$, $l$ and $m$ within the casing sides; an exhaust-chamber $r$; an inlet-passage S and T to supply the outer row or series of nozzles; a centrally-located shaft; a turbine-wheel D with concentric rows of annular buckets $b$ $h$ and $p$ thereon, such buckets being U-shaped, semicircular in cross-section, an annular groove being formed through each series thereon and each bucket being recurved to receive the impulse from a nozzle at one side and to be advanced by the reaction of the fluid from the other side; means for adjusting the bearing of the disk to control its relation to the said nozzles and rings; nozzle-rings M and N adapted to be secured to the casing side B having nozzles $a$ and $g$ formed on the peripheries thereof by diagonal kerfs therein, the face sides conformed to fit the annular grooves of said buckets and having exit-passages $c$ and $k$ through the inner part of said rings and leading from the inner sides of said rows of buckets; and a ring O with a suitable flange O'' for securing the same in place, having nozzles $n$ formed around its periphery and being of such dimension as to leave the inner sides of the inner ring of buckets open to form a continuous circular exit-passage at the center leading into the exhaust-chamber $r$; as specified.

10. In an elastic-fluid turbine-engine, the combination of a base H; a ring-casing A with sides B B therefor with passages for distributing the steam to different points in the circumference of the said casing; series of chambers $e$, $l$ and $m$ within the casing sides; an exhaust-chamber $r$ extending from the center of said casing outwardly within the outer shell, to embrace and insulate the internal parts by a jacket of the fluid; an inlet-passage S and T to supply the outer row or series of nozzles; a centrally-located shaft with a flange thereon; a turbine-wheel D with concentric rows of annular buckets $b$ $h$ and $p$ thereon, such buckets being U-shaped, semicircular in cross-section, an annular groove being formed through each series thereon and each bucket being recurved to receive the impulse from a nozzle at one side and to be advanced by the reaction of the fluid from the other side secured to said flange; means for adjusting the bearing of the disk to control its relation to the said nozzle and rings; and nozzle-rings M and N adapted to be secured to the casing side B having nozzles $a$ and $g$ formed on the peripheries thereof by diagonal kerfs therein, the face sides conformed to fit the annular grooves of said buckets and having exit-passages $c$ and $k$ through the inner part of said rings and leading from the inner sides of said rows of buckets, coacting as specified.

11. In an elastic-fluid turbine-engine, the combination of a base H; a ring-casing A with sides B B therefor with passages for distributing the steam to different points in the circumference of the said casing; series of chambers $e$, $l$ and $m$ within the casing sides; an exhaust-chamber $r$ extending from the center of said casing outwardly within the outer shell, to embrace and insulate the internal parts by a jacket of the fluid; an inlet-passage S and T to supply the outer row or series of nozzles; a centrally-located shaft with a flange thereon; a turbine-wheel D with concentric rows of annular buckets $b$ $h$ and $p$ thereon, such buckets being U-shaped, semicircular in cross-section; means for adjusting the bearing of the disk to control its relation to the said nozzles and rings; nozzle-rings M and N adapted to be secured to the casing side B having nozzles $a$ and $g$ formed on the peripheries thereof by diagonal kerfs therein and having exit-passages $c$ and $k$ through the inner part of said rings and leading from the inner sides of said rows of buckets; and a ring O with a suitable flange O" for securing the same in place, having nozzles $n$ formed around its periphery and being of such dimension as to leave the inner sides of the inner ring of buckets open to form a continuous circular exit-passage at the center leading into the exhaust-chamber $r$; coacting for the purpose specified.

12. In an elastic-fluid turbine-engine, the combination of a base H; a ring-casing A with sides B B therefor with passages for distributing the steam; chambers $e$, $l$ and $m$ within the casing sides; an exhaust-chamber $r$ extending from the center of said casing outwardly within the outer shell, to embrace and insulate the internal parts by a jacket of the fluid; an inlet-passage S and T to supply the outer row or series of nozzles; a centrally-located shaft wth a flange thereon; a turbine-wheel D with concentric rows of annular buckets $b$ $h$ and $p$ thereon, such buckets being U-shaped, semicircular in cross-section, an annular groove being formed through each series thereon and each bucket being recurved to receive the impulse from a nozzle at one side and to be advanced by the reaction of the fluid from the other side, secured to said flange; means for adjusting the bearing of the disk to control its relation to the said nozzles and rings; nozzle-rings M and N adapted to be secured to the casing side B having nozzles $a$ and $g$ formed on the peripheries thereof by diagonal kerfs therein, the face sides conformed to fit the annular grooves of said buckets and having exit-passages $c$ and $k$ through the inner part of said rings and leading from the inner sides of said rows of buckets; a ring O with a suitable flange O" for securing the same in place, having nozzles $n$ formed around its periphery and being of such dimension as to leave the inner sides of the inner ring of buckets open to form a continuous circular exit-passage at the center leading into the exhaust-chamber $r$; and passages $r^3$ from the exhaust-chamber to the exhaust-passages U V to the base, coacting as specified.

13. In an elastic-fluid turbine-engine, the combination of a base H; a ring-casing A with sides B B therefor with passages for distributing the steam; series of chambers $e$, $l$ and $m$ within the casing sides; an exhaust-chamber $r$; an inlet-passage S and T to supply the outer row or series of nozzles; a centrally-located shaft; a turbine-wheel D with concentric rows of annular buckets $b$ $h$ and $p$ thereon, such buckets being U-shaped, semicircular in cross-section, an annular groove being formed through each series thereon and each bucket being recurved to receive the impulse from a nozzle at one side and to be advanced by the reaction of the fluid from the other side; means for adjusting the bearing of the disk to control its relation to the said nozzles and rings; nozzle-rings M and N adapted to be secured to the casing side B having nozzles $a$ and $g$ formed on the peripheries thereof by diagonal kerfs therein the face sides conformed to fit the annular grooves of said buckets and having exit-passages $c$ and $k$ through the inner part of said rings and leading from the inner sides of said rows of buckets; and a ring O with a suitable flange O" for securing the same in place, having nozzles $n$ formed around its periphery and being of such dimension as to leave the inner sides of the inner ring of buckets open to form a continuous circular exit-passage at the center leading into the exhaust-chamber $r$, coacting as specified.

14. In an elastic-fluid turbine-engine, the combination of a base H; a ring-casing A with sides B B therefor with passages for distributing the steam; series of chambers $e$, $l$ and $m$ within the casing sides; an exhaust-chamber $r$ extending from the center of said casing outwardly within the outer shell, to embrace and insulate the internal parts by a jacket of the fluid; an inlet-passage S and T to supply the outer row or series of nozzles; a centrally-located shaft with a flange thereon; a turbine-wheel D with concentric rows of annular buckets $b$, $h$ and $p$ thereon, such buckets being U-shaped, semicircular in cross-section, an annular groove being formed through each series thereon and each bucket being recurved to receive the impulse from a nozzle at one side and to be advanced by the reaction of the fluid from the other side, secured to said flange; means for adjusting the bearing of the disk to control its relation to the said nozzles and rings; nozzle-rings M and N adapted to be secured to the casing side B having nozzles $a$ and $g$ formed on the peripheries thereof by diagonal kerfs therein, the face sides conformed to fit the annular grooves of said buckets, and having exit-passages $c$ and $k$ through the inner part of said rings and leading from the inner sides of said rows of buckets; and a ring O with a suitable flange O'' for securing the same in place, having nozzles $n$ formed around its periphery and being of such dimension as to leave the inner sides of the inner ring of buckets open to form a continuous circular exit-passage at the center leading into the exhaust-chamber $r$; coacting as specified.

15. In an elastic-fluid turbine-engine, the combination of a base H; a ring-casing A with sides B B therefor with passages for distributing the steam; series of chambers $e$, $l$ and $m$ within the casing sides; an exhaust-chamber $r$ extending from the center of said casing outwardly within the outer shell, to embrace and insulate the internal parts by a jacket of the fluid; an inlet-passage S and T to supply the outer row or series of nozzles; a centrally-located shaft with a flange thereon; a turbine-wheel D with concentric rows of annular buckets $b$ $h$ and $p$ thereon, such buckets being U-shaped, semicircular in cross-section; means for adjusting the bearing of the disk to control its relation to the said nozzles and rings; nozzle-rings M and N adapted to be secured to the casing side B having nozzles $a$ and $g$ formed on the peripheries thereof by diagonal kerfs therein and having exit-passages $c$ and $k$ through the inner part of said rings and leading from the inner sides of said rows of buckets; and a ring O with a suitable flange O'' for securing the same in place, having nozzles $n$ formed around its periphery and being of such dimension as to leave the inner sides of the inner ring of buckets open to form a continuous circular exit-passage at the center leading into the exhaust-chamber $r$, coacting as specified.

16. In an elastic-fluid turbine-engine, the combination of a turbine-wheel with a series of recurved buckets on its face; a casing with a series of chambers thereon, increasing in size in the direction of the flow of the fluid; nozzle-passages leading to the buckets from said chambers with exit-passages leading from the buckets to the chambers successively; and an increasing number of nozzle-passages from the sucessive chambers, whereby the elastic fluid in its advance around the wheel will expand and its expansive force will be utilized.

17. In an elastic-fluid turbine-engine, the combination of a turbine-wheel with a series of recurved buckets on its opposite face; a casing with a series of chambers thereon, increasing in size in the direction of the flow of the fluid; nozzle-passages leading to the buckets from said chambers with exit-passages leading from the buckets to the chambers successively; and an increasing number of nozzle-passages leading from the successive chambers, whereby the elastic fluid in its advance around the wheel will expand and its expansive force will be utilized.

18. In a turbine-engine, the combination of a suitable disk with a plurality of rows of buckets on its face; a casing embracing the same, with chambers formed therein, increasing in capacity in the direction of the flow of the steam, beginning at the periphery and extending toward the center in spiral form; exit-passages from the buckets leading to the successive chambers; and nozzle-passages leading from said chambers, the number of the same from each chamber being increased in proportion to the dimension thereof, whereby the expansive force of the steam will be utilized, and also backage prevented.

19. In a turbine-engine, the combination of a suitable casing having nozzles for delivering to the buckets, of substantially rectangular form; and a turbine-wheel with buckets of the recurved type formed in the face thereof and obliquely therein with the outer portion extended at an acute angle whereby the mouth of the bucket for the reception of the steam from the nozzle is substantially rectangular in form.

20. In an elastic-fluid turbine-engine, the combination of a suitable casing; a turbine-wheel therein, with obliquely-arranged recurved buckets formed in the opposite faces thereof, the buckets overlapping each other at each side and the inner points of the buckets from opposite sides alternating with each other and overlapping to secure the maximum number of buckets within a given space, as specified.

21. In an elastic-fluid turbine-engine, the combination of a suitable casing; a turbine-wheel therein, with obliquely-arranged recurved buckets of regular, substantially semicircular contour formed within the opposite faces thereof securing an integral construction, the buckets overlapping each other at each side, to secure the maximum number of buckets within a given space, as specified.

22. In an elastic-fluid turbine-engine, the combination of a suitable casing; a turbine-wheel within the casing; buckets in the face of said turbine-wheel, which are recurved; an annular groove semicircular in cross-section formed within the row of buckets; a ring for the casing, conforming to the said groove, whereby the full effects of the steam are utilized in its reaction in the buckets, for the purpose specified.

23. In an elastic-fluid turbine-engine, the combination of a suitable casing with chambers therein; a disk with buckets therein; removable rings for closing the chambers in said casing and forming nozzle-passages therefrom to the said buckets, the nozzles being formed by suitable oblique kerfs on the edges of said rings; exit-passages through said rings, as specified.

24. In an elastic-fluid turbine-engine, the combination of a suitable casing with chambers therein; a disk with buckets therein; removable rings for closing the chambers in said casing and forming nozzle-passages therefrom to the said buckets, the nozzles being formed by suitable oblique kerfs on the edges of said rings, as specified.

In witness whereof I have hereunto set my hand and seal in the presence of two witnesses.

CHARLES W. DAKE. [L. S.]

Witnesses:
ADELAIDE I. ADAMS,
OTIS A. EARL.